May 20, 1969   C. R. THORNTON   3,444,867
MOBILE CART WASHER

Filed Sept. 11, 1967   Sheet 1 of 2

INVENTOR.
CHARLES R. THORNTON
BY Schapp & Hatch
ATTORNEYS

May 20, 1969
C. R. THORNTON
3,444,867
MOBILE CART WASHER
Filed Sept. 11, 1967
Sheet 2 of 2
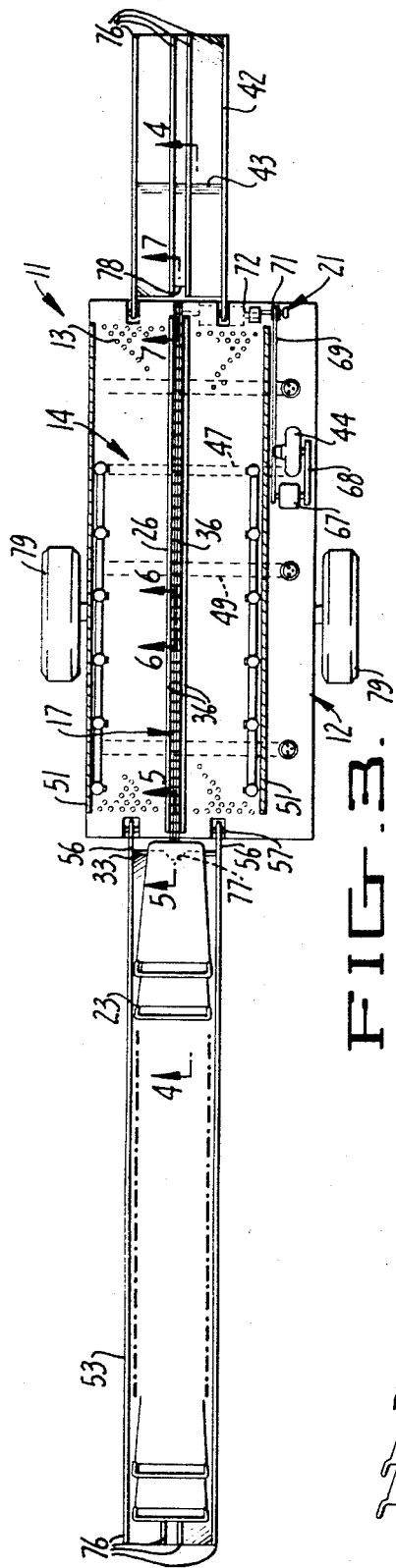
FIG. 3.
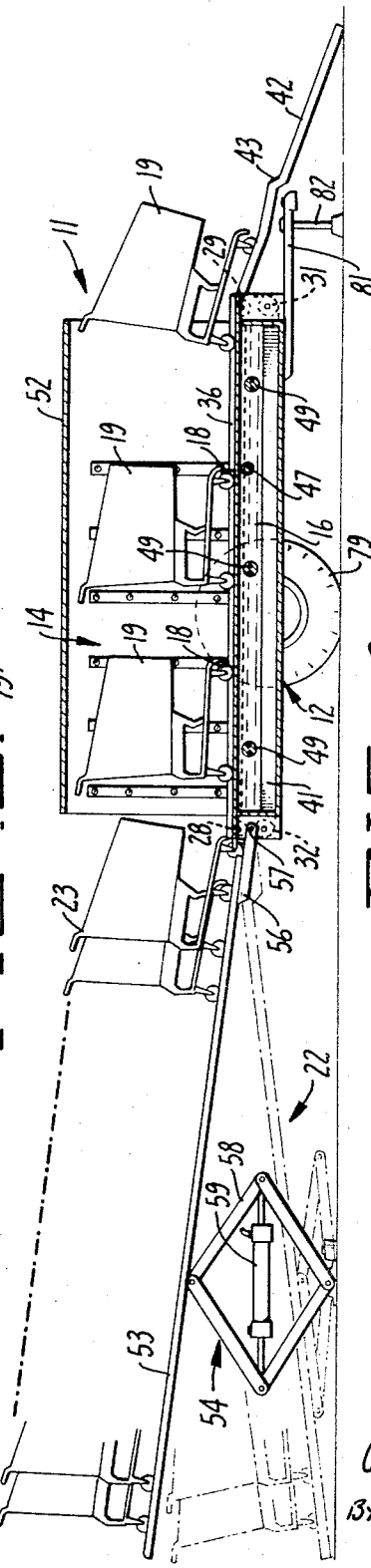
FIG. 4.
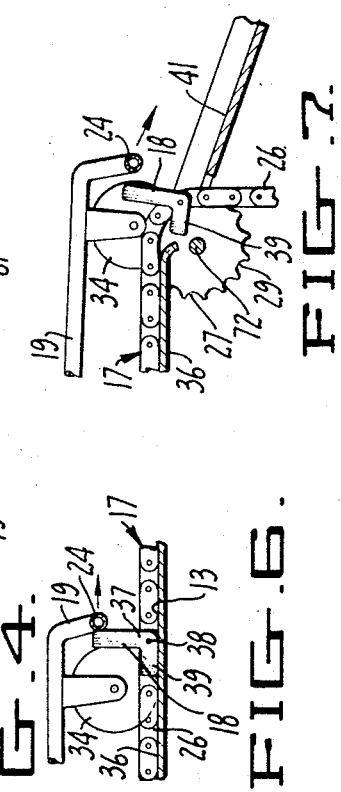
FIG. 7.
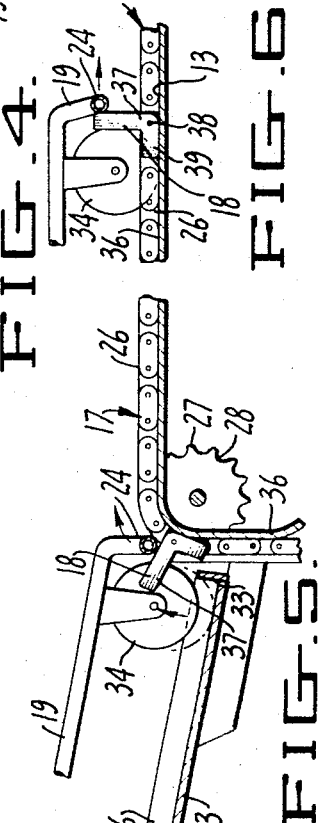
FIG. 6.
FIG. 5.
INVENTOR.
CHARLES R. THORNTON
By Schapp & Hatch
ATTORNEYS

United States Patent Office 3,444,867
Patented May 20, 1969

3,444,867
MOBILE CART WASHER
Charles R. Thornton, 775 Victoria Ave.,
San Leandro, Calif. 94577
Filed Sept. 11, 1967, Ser. No. 666,596
Int. Cl. B60s 3/04
U.S. Cl. 134—123                                11 Claims

ABSTRACT OF THE DISCLOSURE

A washer for grocery shopping type carts, having a wash station with nozzles mounted to spray a heated wash fluid at the cart, a continuous conveyor chain running through a track along the floor of the station with fingers for engaging the lower front part of the cart, a reservoir located below the station to receive wash fluid drained from the station, a recirculating pump for the wash fluid, and an elevating mechanism including a platform having one end pivotally attached near the floor of the wash station at the entry end and the distal end raised by a scissors-jack mechanism to lift a nested group of carts to the level of the floor of the wash station, where they feed by gravity toward the chain. When the foremost cart engages the chain, the engaged part of the cart is below the level of the beginning of the chain flight through the wash station, so that the cart is slightly lifted by the finger as it is pulled off the platform to disengage it from the remaining carts. The fingers are pivotally attached to the chain and constrained by the track to stand up from the chain to engage the cart. The track terminates at the exit of the wash station, removing the constraint on the fingers to assure positive release of the cart. A ramp having a bump in it to shake off water conducts the carts back to ground level.

Background of the invention

This invention relates to a mobile cart washer, and more particularly to apparatus for automatically cleansing in one-at-a-time order carts of the grocery shopping type taken from a nested stack of such carts.

Previous grocery cart washers have suffered from a number of disadvantages. One such disadvantage was the tendency to use wasteful amounts of the wash fluid and require extensive drain facilities nearby. A further disadvantage lay in the amount of attention required from the operator of the washer; many required more than one person in attendance for efficient operation. Some required that the grocery carts be separated by hand from the nested stack in which they are usually stored and moved, so that the operator was required to be constantly occupied with separating the carts to feed them to the washer, and was not left free to move up further batches of carts, take away cleaned carts, or otherwise service the washer. Other prior art washers washed the carts in bunches while nested, but this procedure has been found not to result in a satisfactory degree of cleansing, due to the debris sticking between the carts.

Summary of the invention

In the mobile cart washer of the present invention, the wash liquid is recycled for prevention of the waste of heated water and cleaning agent, and to ease the drainage problems posed by washers which do not recycle the fluid. The wash liquid drains through the floor of the wash station into the wash liquid reservoir below, where it is heated. From this reservoir, it is pumped by the recirculating pump back to the spray nozzles at the station.

Placing the liquid reservoir below the wash station in a mobile washer requires that the carts be elevated from ground level to the level of the wash station, and the present invention provides an elevating platform for doing this. Once elevated, the carts feed toward a continuous chain conveyor by gravity, where they are automatically separated one at a time from the nested stack and engaged by the chain conveyor, which propels them through the wash station. As the carts are separated by the machinery automatically, the operator is freed to attend to other aspects of the washer's operation. The operator need only occasionally lower the elevating platform to load additional carts on it. The configuration of the conveyor and the elevating means causes the foremost cart to be lifted slightly as it is pulled forward, to disengage it from the nested stack. Thus the carts are washed individually, for the greatest efficiency of cleaning.

The chain conveyor engages the carts by a finger on the chain generally upstanding from the chain. At the exit end of the wash station, the finger is released from its upstanding relation to the chain, and the cart is released to roll down a sloping ramp to ground level. A bump in the sloping ramp jars the carts to shake off excess water, and drying is hastened by the heat imparted to the cart by the heated wash liquid. The elevating platform is raised by a jack mechanism with the controls located so the operator may reach them while holding the stack of carts on the platform, to further facilitate one-man operation of the washer.

Accordingly, it is a principal object of the present invention to provide a mobile grocery cart washer which conserves the heated wash liquid and eliminates the problems of drainage of wash liquid.

It is a further principal object of the present invention to provide a washer of the character described which automatically separates carts from the nested stack to feed them one at a time through the wash station.

Another object of the present invention is to provide a mobile grocery cart washer which may be efficiently operated by one man to thoroughly cleanse the carts.

A still further object of the present invention is to provide a mobile grocery cart washer which reduces the effort required to lift the nested stack of carts to the level of the wash tunnel.

Further objects and advantages of this invention will appear as the specification progresses, and the new and useful features of the invention will be fully defined in the claims attached hereto.

Brief description of the drawings

The preferred form of the present invention is illustrated in the accompanying drawings, in which:

FIGURE 3 is a cross-sectional plan view taken approximately along the plane of lines 3—3 of FIGURE 1.

FIGURE 4 is a cross-sectional elevation view taken approximately along the plane of lines 4—4 of FIGURE 3.

FIGURE 5 is an enlarged cross-sectional view taken approximately along the plane of lines 5—5 of FIGURE 3.

FIGURE 6 is an enlarged cross-sectional view taken approximately along the plane of lines 6—6 of FIGURE 3.

FIGURE 7 is an enlarged cross-sectional view taken approximately along the plane of lines 7—7 of FIGURE 3.

Figure 1:
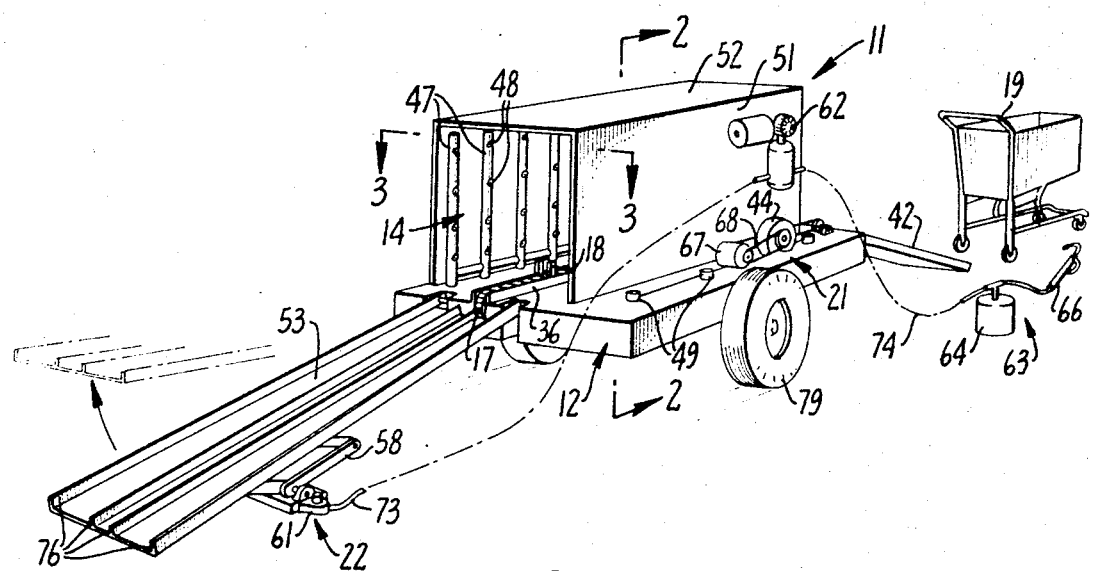
FIGURE 1 is a perspective view of the mobile cart washer of the present invention.
Figure 2:
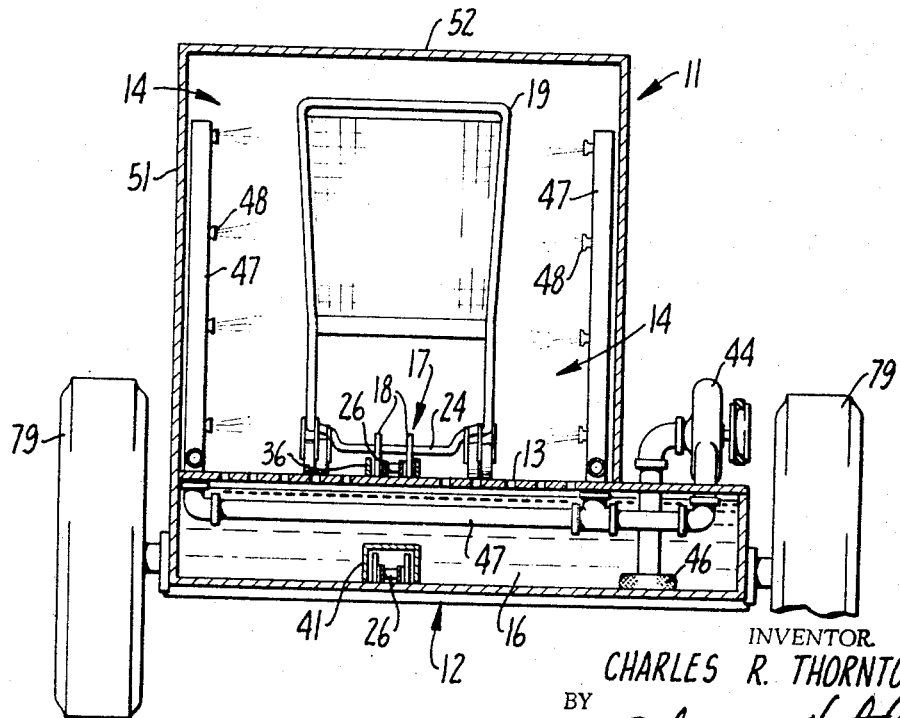
FIGURE 2 is an enlarged cross-sectional view taken approximately along the plane of lines 2—2 of FIGURE 1.

While only the preferred form of the invention has been shown here, it should be understood that various changes and modifications may be made within the scope of the claims attached hereto without departing from the spirit of the invention.

Description of the preferred embodiment

The cleansing apparatus 11 of the present invention includes a mobile chassis 12, a perforate floor 13 mounted on the chassis 12 to provide a wash station 14 above the floor 13, and a wash liquid reservoir 16 mounted on the chassis 12 below the wash station 14 to receive wash liquid from the wash station. A conveyor means 17 is mounted adjacent the floor 13 of the wash station 14 and has members 18 projecting from the conveyor means 17 to engage the individual carts 19, and drive means 21 advances the conveyor means 17 to move the carts through the wash station 14. An elevating means 22 raises a nested group 23 of carts 19 to the level of the floor 13.

The member 18 projecting from the conveyor means 17 acts as best seen in FIGURE 5 to disengage one cart 19 at a time from the group of carts 23 on the elevating means 22 by engaging and lifting the front portion 24, usually a transverse bar, of the foremost cart 19 in the group 23 to pull the cart 19 toward the wash station 14. As here shown, the conveyor means 17 is formed of a closed loop of roller chain 26 passing over a series of guide members 27 which help form its path. Other forms of continuous loop members, such as flexible belting, could likewise be used, with the appropriate guiding members. With the roller chain shown here, the most appropriate form for the guide member 27 is a toothed sprocket. In the embodiment shown here, four such sprockets, 28, 29, 31, and 32 guide the roller chain 26.

One sprocket 28 is located adjacent the floor 13 and the entry end of the wash station 14. The elevating means 22 raises the group of carts 23 to a position in which the front portion 24 of the foremost cart in the group lies below the top of the sprocket 28 (see FIGURE 5). This results in the first cart being slightly lifted as it is engaged and pulled forward to shake it free of the carts remaining in the group 23 behind it. The front portion 24 may be permitted to rub against the chain 26 before engagement by the member 18, but if desired this may be prevented by providing a stop 33 at the end of the elevating means 22 for engaging the front wheels 34 of the foremost cart 19. The lifting action then serves also to free the foremost cart from the stop means, as seen in FIGURE 5.

The roller chain 26 is supported for that part of its travel during which it engages the carts 19 by a track 36 lying generally atop and along the floor 13. The members 18 are here shown as bell cranks 37 pivotally attached to links of the chain 26 by pins 38. The shorter arm 39 of the bell crank 37 slides along the track 36 to constrain the shorter arm 39 to remain generally parallel to the track and the chain 26. The other arm of the bell crank 37 is thus constrained to project generally upstanding from the chain 26 to engage the cart 19 as long as the shorter arm 39 contacts the track 36.

The track 36 extends slightly around the sprocket 28, as shown in FIGURE 5, to constrain the bell crank 37 as it approaches the front portion 24 of the cart 19. The track terminates near the sprocket 29 at the exit end of the wash station 14 to release the member 18 by allowing the bell crank 37 to pivot counterclockwise as seen in FIGURE 7. The carts would usually release from engagement with the conveyor means 17 as the chain 26 passed around the sprocket 29, but should a cart not roll clear for any reason, the member 18 might jam against the front portion 24 as the member 18 turned downward, if it remained constrained. To prevent this, the track terminates and releases the constraint on the member 18. The chain 26 returns to the entry end of the wash station 14 through a tunnel 41 beneath the wash liquid reservoir 16.

From the exit end of the wash station 14, a sloping ramp 42 descends to ground level to carry the washed carts away. The ramp 42 is pivotally attached to the chassis 12 near the floor 13 as shown in FIGURE 3. A discontinuity or bump 43 is formed in the surface of the ramp 42 to jar the carts as they pass, to shake off excess water.

A pump 44 is mounted on the chassis 12 and connected to an intake 46 in the wash liquid reservoir 16 and outlet conduits 47. Spray nozzles 48 are loctaed along the outlet conduits 47 to direct a spray of wash fluid at the carts passing through the wash station 14. The spent wash fluid passes through the perforate floor 13 and returns to the wash liquid reservoir 16, from which it is recirculated by pump 44. Since the cleaning process is often more effective when the liquid is heated, the cart washer here provides heaters 49 located in the wash liquid reservoir 16. As shown here, the heaters 49 are of the electric immersion type, but it should be appreciated that other means, such as liquified petroleum gas burners, could likewise be used.

Since the wash fluid is recirculated, considerable economy is achieved in the use of heat for the fluid, as well as a saving in the cost of detergent additive and simplification of the drainage problems stemming from disposal of large volumes of waste liquid. To further conserve the wash liquid and make the entire apparatus less messy in its operation, upstanding side wall members 51 may be mounted on the chassis 12 along the wash station 14, and a roof 52 may be formed between the side wall members 51 to enclose the wash station 14 in tunnel fashion.

The elevating means 22 here includes a platform 53 movable between a position with one of its ends at ground level and an elevated position with that end at least as high as perforate floor 13. A motive means 54 lifts the platform 53 from ground level to the elevated position while the platform bears a group 23 of carts. The other end of the platform 53 is pivotally attached to the chassis 12 by arms 56 journaled on pins 57 mounted on the chassis. The pivotal end of the platform 53 thus remains essentially at the level of the perforate floor 13 while the distal end of the platform 53 is raised and lowered. As here shown, the distal end of the platform 53 is raised to a level slightly above the floor 13 to provide a slope which feeds the carts toward the wash station, as shown in FIGURE 4.

The motive means 54 here includes a scissors-jack mechanism 58, a pneumatic cylinder 59, and a control valve 61 for selectively admitting and releasing air from the pneumatic cylinder 59. When the cylinder is expanded, as shown in phantom in FIGURE 4, the distal end of the platform 53 is lowered to ground level to receive a nested group of carts 23 for washing. When the cylinder is contracted, as shown in solid in FIGURE 4, the distal end of the platform is raised to feed the carts into the wash station 14.

The control valve 61 is located so as to be readily accessible to the operator while he is near the distal end of the platform 53, so that he may hold the group of carts 23 on the platform while it is being raised. This makes possible the one man operation of the cleansing apparatus 11. The control valve 61, for instance, may be made foot-operated, and placed adjacent the distal end of the conveyor, such as in the vicinity of the scissors-jack mechanism.

It must be appreciated that other motive means than the scissors-jack mechanism shown here could also be used, such as a hydraulic piston acting directly upon the underside of the platform 53, or a scissors-jack mechanism actuated by a hand screw rather than a pneumatic cylinder. Moreover, it is not vital that the inner end of the platform be pivotally attached to the chassis; the entire platform could be formed to rise from a position generally parallel to the ground to the elevated and tilted position by a mechanism such as a scissors-jack of unequal arm length. However, the mechanism here shown offers advantages of compactness, simplicity, and precise alignment of the inner end of the platform 53 with the conveyor means 17.

A source of compressed air, such as a compressor 62, is provided for operating the pneumatic cylinder 59, and for operating a lubricating apparatus 63. The lubricating apparatus 63 includes a lubricant reservoir 64 and a grease gun 66, and is used to grease the carts after they have been washed, to restore the lubricant washed away by the hot wash liquid.

The conveyor means 17 and the pump 44 are driven by a prime mover, here shown as an electric motor 67. A V-belt or chain 68 connects the motor 67 with the pump 44, and a similar belt member 69 transmits power from the motor to a pulley or sprocket (whichever is appropriate) 71 mounted on the chassis 12 near the exit end of the wash station 14. The pulley or sprocket 71 may be connected by other belt members and pulleys, as appropriate, to the shaft 72 to which the sprocket 29 is fastened. The sprocket 29 is thus driven to advance the conveyor means 17. The diameters of the pulleys and sprockets used to transmit power from the motor 67 to the pump 44 and the conveyor means 17 are selected to give the appropriate speeds, fast for the pump and relatively slow for the conveyor means, to those mechanisms.

The air compressor 62 is connected to the control valve 61 and the grease gun 66 by flexible conduits 73 and 74, respectively. Channels are formed on the platform 53 and exit ramp 42 by upstanding rails 76. On both the platform and the ramp, the inner pair of rails 76 guide the front wheels of the carts 19, and the outer pair of rails 76 guide the rear wheels of the carts. The ends of both the platform 53 and the ramp 42 are slotted as shown at 77 and 78, respectively, to permit the members 18 to pass by.

The chassis 12 is provided with wheels 79 and a tongue 81 so that it may be towed by a motor vehicle from place to place for use. A depending leg 82 attached to the tongue 81 supports and stabilizes the chassis 12 when the apparatus is in use. For road travel, the platform 53 of the elevating means 22 and the exit ramp 42 may be detached from their pivotal connections to the chassis and stowed inside the tunnel of the wash station.

From the foregoing, it may be seen that a cleansing apparatus has been provided for grocery carts and the like which conserves the heated wash liquid, eliminates problems of drainage of the wash liquid, and may be efficiently operated by one man as a result of its automatic separation of the carts from each other to wash the carts individually and thoroughly without jamming and its power-assisted elevation of the carts to the working level. The cleansing apparatus is likewise adapted for use with unheated water and cold water detergents or other cleaning chemicals where the carts have heat susceptible parts such as plastic advertising signs or wheels. The subject apparatus is readily portable to travel from supermarket to supermarket, is self contained so as to negate requirements for special service connections, is adapted for use on a wide variety of carts under a wide variety of conditions, and provides for complete cleaning and servicing of the carts in a rapid and expeditious manner.

I claim:

1. Cleansing apparatus for grocery carts and the like, comprising:
   a mobile chassis,
   a perforate floor mounted on said chassis to provide a wash station thereabove,
   a wash liquid reservoir mounted on said chassis below said wash station to receive wash liquid therefrom,
   a conveyor means mounted adjacent the floor of said wash station and having members projecting therefrom to engage the individual carts,
   drive means for advancing said conveyor means to move carts through said wash station,
   elevating means for raising a nested group of carts to the level of the floor of said station in a position to be engaged and advanced through said wash station by said conveyor means, said conveyor means being formed for engaging and lifting the front portion of the foremost cart in said nested group to pull the cart toward said wash station, and said conveyor means passing over a series of guide members which help form its path, one of said guide members being adjacent said floor and the entry end of said wash station, said elevating means raising the carts to a position such that the part of the forwardmost cart engaged by said member projected from said conveyor means lies below the top of said one guide member so that upon engagement of said projecting member with the forwardmost cart, the cart will be slightly lifted to free it from the carts remaining behind.

2. Cleansing apparatus for grocery carts as described in claim 1 and wherein said members projecting from said conveyor means are adapted for disengaging one cart at a time from the group of carts on said elevating means and moving the cart into engagement with said conveyor means.

3. Cleansing apparatus as described in claim 1 and wherein said guide members are formed as sprockets and said conveyor means comprises a roller chain loop supported by a track for that part of its travel during which it is in engagement with carts, and said member projecting from said conveyor means is formed as a bell crank pivotally attached to said chain with one arm of the crank riding on said track to maintain said arm generally parallel to said chain and track, and the other arm of said bell crank projecting from said conveyor means to engage the cart, the passing of said chain beyond the portion of its path supported by said track releasing said one arm of said bell crank from the constraint to remain generally parallel to said chain, thereby releasing the other arm of said bell crank from constraint to project from said chain to release the cart from engagement with said conveyor means.

4. Cleansing apparatus as described in claim 3 and wherein said track extends along said floor and depends therefrom at the entry end of said wash station around part of the circumference of said one guide member located thereadjacent, said track terminating adjacent the exit end of said wash station to release said bell crank from engagement with the cart, said cleansing apparatus including a sloping ramp from the exit end of the wash station to ground level, said ramp having a slope discontinuity therein for jarring the carts to shake off water remaining thereon.

5. Cleansing apparatus as described in claim 1 and and wherein said apparatus includes:
   spray nozzles mounted at said wash station for spraying the wash liquid at the cart, and
   a pump for recirculating said wash liquid from said reservoir to said spray nozzles.

6. Cleansing apparatus as described in claim 5 and wherein said apparatus includes a heater for heating the wash liquid.

7. Cleansing apparatus as described in claim 5 and wherein said apparatus includes shield members upstanding from said chassis at said wash station to enclose said wash station and conserve the wash liquid.

8. Cleansing apparatus as described in claim 1 and wherein said elevating means comprises:
   a platform moveable between a position having at least one end at ground level and a position in which said end is at least as high as said perforate floor, and
   motive means for moving said end between said positions while bearing a nested stack of carts thereon.

9. Cleansing apparatus as described in claim 8 and wherein the end of said platform adjacent to said wash station is pivotally attached to said chassis so that it remains substantially at the level of the floor of said wash station, and the distal end of said platform is moved between a position adjacent to ground level and a level at least as high as the floor of said tunnel by said motive means.

10. Cleansing apparatus for grocery carts as described in claim 9 and wherein said motive means comprises:
  a scissor-jack mechanism,
   a pneumatic cylinder for compressing and expanding said scissor-jack mechanism, and
   a valve for selectively releasing and admitting air to said pneumatic cylinder, said valve being accessible to the operator of the cleansing apparatus while the operator is stationed adjacent the distal end of said platform.

11. Cleansing apparatus for grocery carts as described in claim 10 and wherein said apparatus includes a source of compressed air for operating said pneumatic cylinder, and lubricating apparatus operating from said source of compressed air for supplying lubricant to lubricate the carts after they are washed.

References Cited

UNITED STATES PATENTS

| | | |
|---|---|---|
| 1,136,763 | 4/1915 | Bishop _____ 134—133 |
| 2,997,048 | 8/1961 | Gertken et al. |
| 3,096,775 | 7/1963 | Clarke et al. _____ 134—123 |
| 3,258,019 | 6/1966 | Bellas et al. _____ 134—123 XR |
| 3,277,907 | 10/1966 | Goldman _____ 134—123 XR |
| 2,289,238 | 12/1946 | Sorensen et al. ___ 134—123 XR |

ROBERT L. BLEUTGE, *Primary Examiner.*

U.S. Cl. X.R.

134—126, 134